(12) United States Patent
Ebert

(10) Patent No.: US 7,151,453 B2
(45) Date of Patent: Dec. 19, 2006

(54) BI-DIRECTIONAL DATA FLOW IN A REAL TIME TRACKING SYSTEM

(75) Inventor: Peter S. Ebert, Menlo Park, CA (US)

(73) Assignee: SAP Aktiengesellschaft, Walldorf (DE)

( * ) Notice: Subject to any disclaimer, the term of this patent is extended or adjusted under 35 U.S.C. 154(b) by 873 days.

(21) Appl. No.: 10/137,207

(22) Filed: Apr. 30, 2002

(65) Prior Publication Data

US 2003/0144985 A1 Jul. 31, 2003

Related U.S. Application Data

(60) Provisional application No. 60/347,672, filed on Jan. 11, 2002.

(51) Int. Cl.
*G08B 13/14* (2006.01)

(52) U.S. Cl. .............. 340/572.1; 340/572.4; 340/539.11; 340/568.1

(58) Field of Classification Search ........... 340/572.1, 340/572.4, 539.1, 539.11, 539.13, 539.16, 340/539.17, 568.1, 10.568, 10.1; 342/42; 235/385; 219/620, 626
See application file for complete search history.

(56) References Cited

U.S. PATENT DOCUMENTS

| 4,974,166 | A |   | 11/1990 | Maney et al. ............... 700/113 |
| 5,166,884 | A |   | 11/1992 | Maney et al. ............... 700/113 |
| 5,469,363 | A |   | 11/1995 | Saliga ....................... 700/225 |
| 5,936,527 | A |   | 8/1999 | Isaacman et al. ........ 340/572.1 |
| 5,959,568 | A | * | 9/1999 | Woolley ...................... 342/42 |
| 5,963,134 | A |   | 10/1999 | Bowers et al. ........... 340/572.1 |
| 5,971,592 | A |   | 10/1999 | Kralj et al. ................. 700/225 |
| 5,975,416 | A | * | 11/1999 | Chow et al. ................. 235/383 |
| 6,021,443 | A |   | 2/2000 | Bracho et al. ............. 709/241 |
| 6,032,127 | A |   | 2/2000 | Schkolnick et al. .......... 705/23 |
| 6,148,291 | A |   | 11/2000 | Radican ....................... 705/28 |
| 6,177,860 | B1 |   | 1/2001 | Cromer et al. ............. 340/10.1 |
| 6,195,006 | B1 |   | 2/2001 | Bowers et al. ........... 340/572.1 |
| 6,259,367 | B1 |   | 7/2001 | Klein ....................... 340/572.1 |
| 6,292,894 | B1 |   | 9/2001 | Chipman et al. ........... 713/168 |
| 6,301,621 | B1 |   | 10/2001 | Haverstock et al. ........ 709/246 |

(Continued)

FOREIGN PATENT DOCUMENTS

DE 4341880 6/1995

(Continued)

OTHER PUBLICATIONS

Checkpoint Systems Inc., Electronic Signatures technologies support supply chain logistics, Retail News vol. 2, 2001.

(Continued)

*Primary Examiner*—Van T. Trieu
(74) *Attorney, Agent, or Firm*—Fish & Richardson P.C.

(57) ABSTRACT

Methods and apparatus, including computer program products, for updating information on a writable tag bound to an article. In one aspect, a method includes: receiving in a system first attribute information for a first article derived from data read automatically from a first tag bound to the article; similarly receiving second attribute information for a second article; receiving sensor information derived from a sensor coupled to the second article; receiving relationship information specifying a relationship between the articles; maintaining first and second virtual articles representing the first article and the second article and sensor information, respectively, and maintaining a context object representing the relationship; recognizing an alert condition relating to the first article; generating updated attribute information; detecting the presence of the first tag at a tag writer station after the alert condition; and causing the tag writer station to write the updated information to the first tag.

58 Claims, 9 Drawing Sheets

U.S. PATENT DOCUMENTS

| | | | |
|---|---|---|---|
| 6,320,169 B1* | 11/2001 | Clothier | 219/626 |
| 6,321,230 B1 | 11/2001 | Joslin et al. | 707/100 |
| 6,671,698 B1 | 12/2003 | Pickett et al. | 707/104.1 |
| 6,684,119 B1 | 1/2004 | Burnard et al. | 700/106 |
| 6,816,075 B1* | 11/2004 | Grunes et al. | 340/572.1 |

FOREIGN PATENT DOCUMENTS

| | | |
|---|---|---|
| DE | 19623893 | 12/1997 |
| DE | 198 05 465 A1 | 8/1999 |
| DE | 19844631 | 4/2000 |
| DE | 19951060 | 5/2000 |
| DE | 19955120 | 5/2001 |
| DE | 101 26 527 A1 | 12/2002 |
| EP | 0 748 080 A1 | 12/1996 |
| EP | 0908643 | 4/1999 |
| EP | 0913758 A2 | 5/1999 |
| EP | 1174807 A1 | 1/2002 |
| GB | 2308947 | 7/1997 |
| WO | WO 00/26111 | 5/2000 |
| WO | WO 00/45324 | 8/2000 |
| WO | WO 02/19046 A1 | 3/2002 |
| WO | WO 02/47014 | 6/2002 |

OTHER PUBLICATIONS

Sanjay Sarma, Auto-ID Center: Lessons Learned, Auto-ID Center-MIT, Nov. 23, 2001.

Auto-ID Center Website—Technology Section, Introduction to Auto-ID, http://www.autoidcenter.org/technology, Jan. 7, 2002.

Sylvia Tiisetso Khabele, RFID Security, CSC400W: Network and Internetwork Security, skhabele@cs.uct.ac.za, May 18, 2001.

Kevin R. Sharp, Senior Technical Editor, ID Systems.com, Planning for RFID Ubiquity, http://www.idsystems.com/reader/2000_07/plan0700.htm, Jul. 2000.

Raghu das et al., The Internet of Things, IDTechEx Ltd., http://www.idtechex.com/book9.html, 2001.

David L. Brock, The Physical Markup Language, MIT Auto-ID Center, Feb. 2001.

George Cole, The little label with an explosion of applications, Financial Times- FT.com, http://news.ft.com/ft/gx.cgi/ftc?pagename=View&c=Article&cid=FT30414MGWC, Jan. 14, 2002.

EAN International, Uniform Code Council, Inc., EAN.UCC White Paper on Radio Frequency Identification, Nov. 1999.

Sanjay Sarma et al., White Paper- The Networked Physical World, MIT Auto-ID Center, Oct. 1, 2000.

John Stermer, Radio Frequency ID: A New Era for Marketers?, Consumer Insight, Winter 2001.

Mary Ann Falkman editor, RFID smart labels track chilled foods door to door, Packeting Digest, Nov. 2000.

Cheryl Rosen, RFID Chips Put To The Test, Informationweek.com, http://www.informationweek.com/story/IWK20010628S0008, Jul. 2, 2001.

M-Lab—A Joint Initiative of ETH Zurich and HSG, The Mobile and Ubiquitous Computing Lab, Project Plan, www.m-lab.ch, English version 1.02e, St. Gallen/Zurich, Jun. 21, 2001.

Rachel Melcer, P&G's Vision, Business Courier, May 18, 2001.

Elgar Fleisch et al., From computing visions to show cases, M-Lab, First M-Lab Steering Committee Meeting, Nov. 22-23, 2001, Zurich.

Charles J. Murray, Motorola cuts bar code replacement effort, EE Times, Nov. 16, 2001.

Savi Technology Inc. Press Release, CHEP to deploy Savi Technology's Asset Management Software, Nov. 6, 2001.

Jay Wrolstad, American Airlines Deploys Wireless System to Monitor Cargo, CRNDaily.com, Oct. 12, 2001.

Jay Wrolstad, Wireless tags help grocers deliver fresh food, CRMDaily.com, Oct. 2, 2001.

SAMSys, Inc. press release, International Paper selects SAMSys Technologies as primary RFID reader supplier, Jan. 5, 2001.

Infineon press release, Infineon enters fast growing "smart label" market with my-d, defines new paradigm for cost effective radio frequency identification solutions, Sep. 11, 2001.

MIT Auto-ID Center, MIT-AUTOID-WH-001, "The Networked Physical World", MIT Auto-ID Center, Dec. 2000.

David L. Brock, MIT Auto-ID Center, MIT-AUTOID-WH-002, "The Electronic Product Code", Jan. 2001.

Auto-ID Center, Technical Manual, "The Object Name Service", Version 0.5 (Beta), Oat Systems & MIT Auto-ID Center, Feb. 1, 2002.

KnowNow Product Brief: "KnowNow Architecture Overview", 2002.

Segall et al., "Content Based Routing with Elvin4" Jun. 2000.

White Paper, SAP® Consumer Products, From Demand Planning to Vendor Managed Inventory with SAP APO. "DRP and VMI for the Consumer Products Industry", 1999.

Hoffman, Kurt C., "Real-time Location Systems Take Asset Tracking to New Level," http://www.supplychainbrain.com/archives/10.01, Oct. 2001, 5 pgs., XP002259982.

"KnowNow Unveils 'n-way' EAI over the Internet," Searchwebservices, Jun. 28, 2001, 2 pgs., XP002259981.

Margulius, David L., "Dawn of Real-time enterprise," Infoworld, http://www.infoworld.com/article/02/01/17/020121fetca_1.html, Jan. 17, 2002, 2 pgs., XP002259980.

"FedEx and Technology—Maintaining a Competitive Edge," Gale Group Newsletter, Dec. 9, 1996, pp. 1-3, XP002961196.

Wang, You-ning, et al., "A GIS Based Information Integration Framework for Dynamic Vehicle Routing and Scheduling,", *Proceedings of the IEEE International Vehicle Electronics Conference*, Changchun, China, Sep. 6, 1999, pp. 474-479, XP010375965.

* cited by examiner

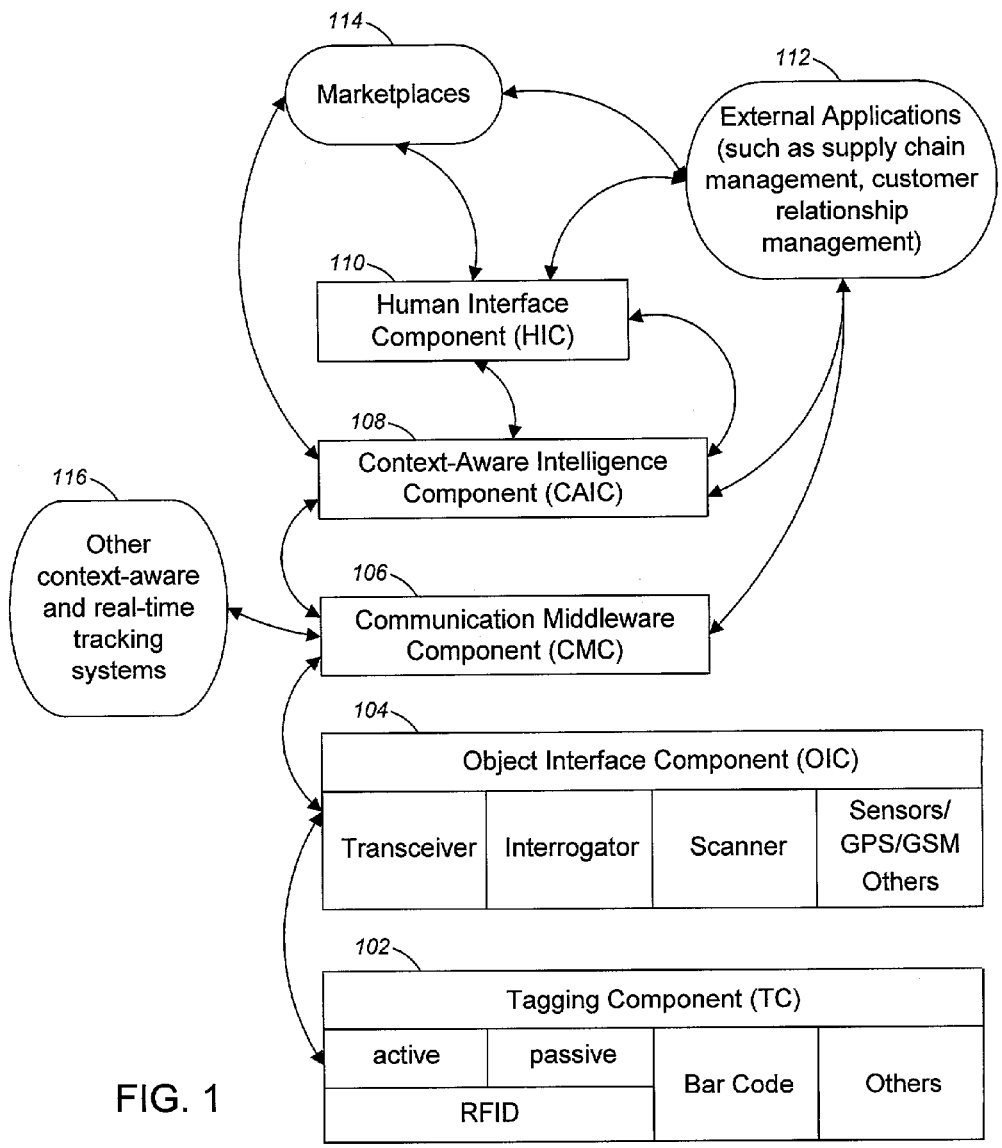

BI-DIRECTIONAL DATA FLOW IN A REAL TIME TRACKING SYSTEM

CROSS-REFERENCE TO RELATED APPLICATIONS

This application claims the benefit of U.S. Provisional Application No. 60/347,672, filed on Jan. 11, 2002.

BACKGROUND OF THE INVENTION

The present invention relates to tracking taggable objects.

A conventional system for tracking tangible objects usually includes computing devices and software. Such systems maintain information that indicates the status, such as a current location, of an object being tracked. This can be thought of as a virtual world.

With conventional systems, there can easily be a discrepancy between the actual status of the object and the status as indicated by the system Discrepancies are often caused by flawed manual data input and system limitations. As a result of such problems, conventional systems can have a distorted and fragmented picture of reality. In addition, most conventional systems see with a very limited scope and resolution, for example, systems that can only distinguish between product classes and quantities and not between individual items.

SUMMARY OF THE INVENTION

This specification describes methods and apparatus, including computer program products, for context-aware and real-time tracking of tagged articles.

The word 'article' is used in this specification to refer to a real, tangible object, so as to avoid ambiguity from use of the word 'object', which will in the following text be used only to refer to a data processing construct. The word article will further be limited to real things that are amenable to being tagged with a tag that can be read by some device.

In general, in one aspect, the invention features systems and methods, and components configured to perform aspects of the methods, for tracking articles. A system in accordance with the invention includes a tagging component that includes information specifying standards for tagging one or more articles with tags, each tag including a globally unique identifier; an object interface component that includes devices for communicating with the tags and that further includes devices for receiving context information; a context-aware intelligence that includes logic for processing context information and logic specifying actions for the system to perform in response to the context information; and a communication middleware component for communication between and among the components of the system and for communicating with devices external to the system.

In general, in another aspect, the invention features systems and methods, and components configured to perform aspects of the methods, for updating information on a writable tag bound to an article. A method in accordance with this aspect performs the actions of receiving in a system first attribute information for a first article, where the first attribute information was derived from data read automatically from a first tag bound to the first article, the first attribute information including a first identifier identifying the first article; receiving in the system second attribute information for a second article, where the second attribute information was derived from data read automatically from a second tag bound to the second article, the second attribute information including a second identifier identifying the second article; receiving in the system sensor information derived from data read automatically from a sensor coupled to the second article; receiving in the system relationship information specifying a relationship between the first article and the second article; maintaining in the system a first and a second physical object representing the first and the second article, respectively, the objects maintaining information representing the first attribute information and the second attribute information and sensor information, respectively, and maintaining in the system a context object representing the relationship between the first and second articles; recognizing an alert condition from information in the physical and context objects, the alert condition relating to the first article; generating updated attribute information to be written to the first article in response to the alert condition; detecting in the system the presence of the first tag at a tag writer station after the alert condition was recognized; and causing the tag writer station to write the updated information to the first tag at the tag writer station upon detecting the presence of the first tag at the tag writer station.

Advantageous implementations can have one or more of the following features. The alert condition is recognized in an application external to the system, the application receiving from the system information from objects maintained by the system. The updated attribute information is generated by the application and provided to the system by the application with a request that it be written to the first tag. The system in response to the request causes the tag writer station to write the updated information to the first tag. The first and second physical objects represent their corresponding articles in a virtual world maintained by the system; and the application monitors the virtual world. The alert condition is recognized by a component of the system operating in accordance with one or more alert rules provided to the system; the updated information is generated by a component of the system operating in accordance with one or more update rules provided to the system; the tag writer station is caused to write the updated information to the first tag in accordance with one or more write-data rules provided to the system. The sensor is bound to the second tag. The sensor is a temperature sensor. The alert condition is generated because a temperature measured by the sensor exceeded a threshold; and the updated information is a reduce product expiration date for the first article. The first tag is a radio frequency transponder. The first and second identifiers are globally unique identifiers.

In general, in another aspect, the invention features systems and methods, and components configured to perform aspects of the methods, for updating information on a writable tag bound to an article. A method in accordance with this aspect performs the actions of receiving in a system first attribute information for a first article, where the first attribute information was derived from data read automatically from a first tag bound to the first article, the first attribute information including a first identifier identifying the first article; receiving in the system updated attribute information for the first article; detecting in the system the presence of the first tag at a tag writer station after receipt by the system of the updated attribute information; and causing the tag writer station to write the updated information to the first tag at the tag writer station upon detecting the presence of the first tag at the tag writer station.

Advantageous implementations can have one or more of the following features. The updated attribute information is generated by an application external to the system and provided to the system by the application with a request that it be written to the first tag; and the system in response to the request causes the tag writer station to write the updated information to the first tag. The system maintains a first physical object representing the first article, the object maintaining the first attribute information; and the method further performs the act of storing in the first physical object the updated attribute information. The first physical object represents its corresponding article in a virtual world maintained by the system; and the application monitors the virtual world. The updated information is generated by a component of the system operating in accordance with one or more update rules provided to the system; and the tag writer station is caused to write the updated information to the first tag in accordance with one or more write-data rules provided to the system. The updated information is updated price information. The updated information is updated expiration information. The updated information is updated regulatory information. The first tag is a radio frequency transponder and the first identifier is a globally unique identifier.

The invention can be implemented to realize one or more of the following advantages. A system in accordance with the invention can be aware of a virtually unlimited number of articles as well as of other things in the real world and relationships between and among articles and other things. The system can be implemented at a wide range of scales. The architecture of the system is easy to work with and can be put to a wide variety of applications simultaneously. The architecture supports the tracking of pretty much anything as an article or as a circumstance that influences an article. Similarly, the architecture permits every kind of attribute to be associated with a tracked article or circumstance. Hierarchical and other relationships can be defined between or among tracked things and used for tracking things in the relationships. The architecture is open to any kinds of data sources, including all kinds of sensors and scanners, as well as systems that provide circumstantial information, for example, weather, traffic conditions, transportation schedules such as air and rail schedules, time of arrival data, and so on. The system provides a generic and intelligent glue between the real world and a virtual world that can be used to provide context-aware and real-time tracking of articles.

The system inherently integrates context-aware intelligence. Such intelligence enables the system to know which geospatial events will affect which of the articles being tracked and take action in response to such events. The system can provide dynamic context-aware intelligence with generic geospatial abilities. Based on available data and telemetry, the system can understand where, how, and what articles are at a specific time in relation to each other and, furthermore, invoke actions according to defined rules.

The system can be integrated with existing software and hardware systems using non-proprietary, open interfaces. With such interfaces, the system is compatible with existing systems without the need for plug-ins or upgrades into the existing systems. For example, the system can provide non-proprietary, open interfaces to integrate virtually every kind of tag, tag reader, scanner, sensor, and application. The system can be implemented to include applications that can generically read data from, and write data to, article tags. The system can include generic tracking of real-time telemetry. The system can integrate existing Geographical Information Systems ("GIS") and data.

The system supports development of a whole range of new or enhanced applications across industries. Such applications include and are not limited to those relating to supply chain management, asset tracking and management, security and access control, transportation, toll collection, point of sale, and baggage handling.

The system is scalable from a local to a global level. That is, the system can be implemented to support a business unit, a single company, or a group of companies, in one or more industries. The system can track articles and circumstances in real time. The system can provide current and past state of articles or groups of articles and can do so remotely, for example, through wireless communication or through a network such as the Internet.

Through a variety of initiatives, in the future a large number of articles of all kinds will be uniquely tagged and identifiable globally, in many cases through automatically operating sensors. The system can operate across industries and companies to provide smart, enterprise-level article tracking solutions. The system provides open, generic, and configurable business methods that can be applied across multiple industries and applications. The business methods allow customers to define generically and introduce virtual representations of articles to a software system over a network, attach rules that invoke actions based on dynamic context data, and query the system for a multitude of attributes related to, or derived from, the present and past contexts of the tracked objects. Tracking data can be shared among partners based on field-level authentication definitions.

The system is accessible to users and external applications through non-proprietary interfaces, e.g., Web browsers or self-describing documents such as XML (Extensible Markup Language) documents. The system can track a large number of uniquely tagged articles and their telemetry data, if any, through time and space. The system provides open, non-proprietary interfaces for sensors, devices, and services that track and provide the location of, and/or telemetry data from, articles or their environment to the system. The system also provides open, non-proprietary interfaces for sensors, devices, and services that write data to physical articles or their tags that can receive such data. The system provides user interfaces, application interfaces, and tools to define virtual representations of uniquely tagged articles and hierarchies of them, including specific attributes and methods; to define rules that can invoke actions based on dynamic context data known to the system; to define virtual representations of physical constraints or other influences that can affect articles; to define sophisticated data access filter settings on an attribute level of data objects representing articles and other real-world things; to query the system for, and to visualize, a multitude of characteristic related to, or derived from, the present and past contexts of the tracked articles; and to share article-related data between or among partners over a network.

The system can be used by diverse entities for their own purposes, and each entity can make part or all of the information about its tagged articles, its data input devices, and its tracked circumstances visible to other entities using the system. The other entities can use this information and get the benefit of the experience and history of the entire community of users of the system, regardless of the purposes for which the information was originally gathered or provided, and without requiring in any respect that the future uses and benefits of the various contributions, or their advantageous interactions, be contemplated at the time the contributions are made.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 1 shows a system in accordance with the invention.

FIG. 2 shows an example of a unique identification code in accordance with the invention.

Like reference numbers and designations in the various drawings indicate like elements.

DETAILED DESCRIPTION

Figure 3:
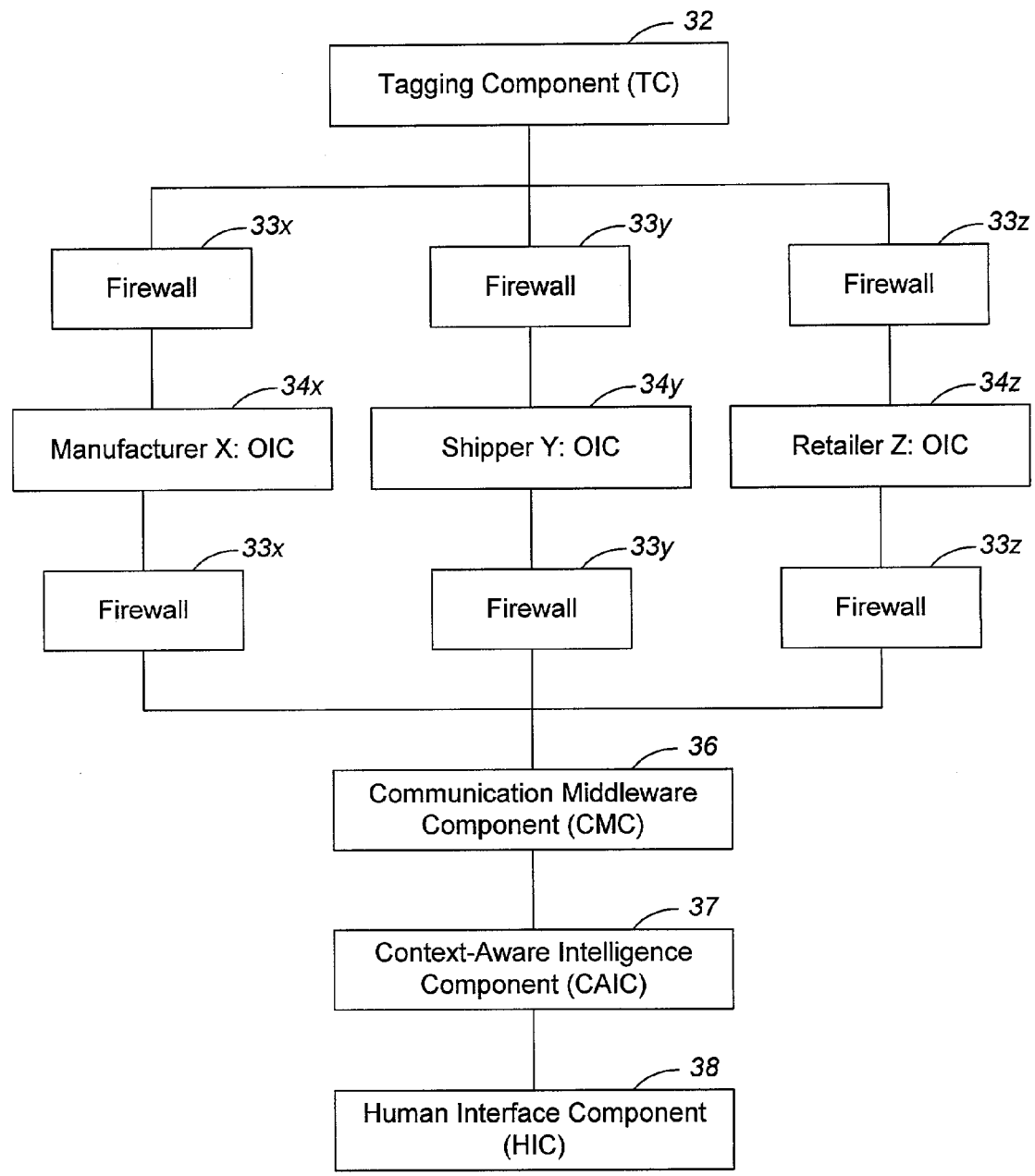
FIG. 3 shows one implementation of the invention.

A System for Real-time and Context-Aware Tracking

A system in accordance with the invention receives information in an open, non-proprietary form, concerning articles and circumstances affecting articles. This information becomes physical objects and context objects, and their attributes, in the system.

In this specification, the term 'physical object' will be used to refer to data that corresponds to and is used as a representation of any article. In any particular implementation, a physical object can be implemented as an object in the object-oriented programming sense of the term; however, it can also be implemented in any other convenient way, for example, by a record in a database. Similarly, the term 'context object' will be used to refer to data that corresponds to and is used as a representation of tangible and intangible things, including, by way of example, relationships and events. Physical and context objects may also be referred to as virtual articles and virtual circumstances. Generally, context objects are created and maintained because they represent something—which may generically be called a circumstance—that has the potential of affecting an article represented by a physical object. One example of circumstances are geospatial events, which can include, for example, hurricanes which can impede the transit of a transport ship carrying the articles being tracked, a labor strike which can prevent the unloading of the articles from the transport ship, and a traffic accident which can delay delivery of the articles. The term hierarchies refers to associations or relationships between and among articles and circumstances. For example, given a can in a pallet of cans, events that affect the pallet also affect the can. Context objects can represent hierarchies.

The system receives information from a variety of sources, which can be coupled to the system through a network such as the Internet or directly. The system can be configured to receive information from sources with proprietary or non-open interfaces, in which case the format of the information is converted to be compatible with the system. The system includes data input devices, for example, tag readers, sensors, and scanners. Through such devices, the system can continuously track and log the state of the articles and circumstances represented by physical and context objects. The state of an article can includes its status, attributes, and location.

As shown in FIG. 1, a context-aware and real-time tracking system in accordance with the invention can be implemented with a Tagging Component ("TC") 102, an Object Interface Component ("OIC") 104, a Communication Middleware Component ("CMC") 106, a Context-Aware Intelligence Component ("CAIC") 108, and a Human Interface Component ("HIC") 110. In an alternative implementation, the HIC 110 is integrated with the other components. Each of these components can be implemented as computer programs executing on one or more computers and controlling devices performing data acquisition, output, and transmission functions. FIG. 1 also shows communication flows (represented by arrows) between and among the components of the context-aware and real-time tracking system as well as between the system and external applications 112, external marketplaces 114, and other, external context-aware and real-time tracking systems 116. The communication flows can be implemented in any convenient, open fashion, such as through the exchange of XML documents.

The components are arranged in a distributed, real-time, and event-based architecture. Each or all components or any combination of the system's components can be implemented on a micro up to a macro level. Micro level implementation refers to implementation on a single device and macro level implementation refers to implementation on multiple devices such as computers in a network. Each component can be distributed across multiple devices, including computers, that are interconnected by a network. Each component can be made up of, that is, implemented as, multiple different applications, which in the aggregate perform the functions of the component. The described component architecture allows the system to group and scale functionality from a local to a global level while assuring that hardware and software can be readily integrating using non-proprietary, standard interfaces.

A component can include software systems—which includes any software, applications, computer program products—and related devices. For example, a software system can be applications and servers operating on an enterprise-level. Communication between or among software systems can take place through a communications network. The components expose non-proprietary, open interfaces for services that are accessible through a network, such as one based on open standards like XML over HTTP. The following text further describes the components.

Tagging Component

Articles introduced to the system are tagged with a unique identifier by any available article-level tagging technology, for example, active and passive Radio Frequency Identification ("RFID") tags, barcodes, and tags that can be applied on a molecular basis.

When the system first becomes aware of an article or circumstance, it will be said to be introduced to the system;

and a corresponding object is created. This physical or context object will also be said to be introduced to the system, and it will be referred to as an "introduced object." The system assigns a specific dynamic n-dimensional context and attribute space to introduced objects. For example, the system can assign owner, price, lot number, and temperature to an introduced object. Optionally, the system attaches specific rules to the introduced objects. For example, the system can attach a rule specifying that if the temperature of the corresponding article reaches level y, then cause action z.

The TC 102 of a particular implementation specifies in an open way which tagging technologies can be used with the system and how they are used. The TC 102 includes a distributed knowledge system based on Internet technology. Specifically, the TC 102 generally will include and provide a specification of the globally unique identifier and how to apply it; catalogues describing the specifications of compliant tags, their reader/writer hardware and all aspects concerning their use; specific standards and laws that apply to the tagging of articles; specifications of standardized communication and context data formats and interfaces; specifications of read and write processes, processing and transmission requirements for active tags, and telemetry data specifications; best industry practices, that is, knowledge relating to selection and deployment of tags and tag content; security and authorization requirements and standards; benchmarks; implementation guides; and frequently asked questions.

In addition, the TC 102 can provide tools, content, software development kits, and applications that enable manufacturers, system integrators, and customers to identify, validate, and implement optimal article-tag-reader/writer combinations and standards for specific scenarios. The TC 102 can be built with any software development environment to fulfill the above-mentioned requirements.

Object Interface Component

The OIC 104 transforms data from attached hardware to the system and vice versa. The OIC 104 can also perform any required local processing.

The OIC 104 is a sophisticated, generic, bi-directional, and smart software interface between the system and the real world. Here, physical objects and context objects are introduced to the system and their status and telemetry data are received, filtered, transformed, pre-processed, and processed as necessary. Because physical objects and context objects can be implemented to carry rules that can trigger alert events or cause actions depending on current context or status data, the OIC 104 can be implemented to embed or link to a rule engine to process these kinds of rules. By customizing the OIC 104, customers can specify what the OIC 104 should do if one of the customer's tag readers detects an article tag—which will have an identifier that the system can map to a unique system identifier ("UID")—for the first time. Such actions can include communication with external applications, for example, ERP (Enterprise Resource Planning) applications.

The OIC 104 also generically specifies and validates how tag interface hardware, for example, RFID readers, barcode scanners, polymer tag readers, and sensors, and its operating software communicate with the system. Consequently, OIC 104 acts as a generic software wrapper around all tag-specific read/write devices, which provides standardized integration; data validation, filtering, and transformation; bi-directional, event-based secure communication; and data pre-processing.

Because the OIC 104 is not only able to receive data but also can send data to hardware and software attached to the system, and ultimately to the tagged articles themselves, the system can use the OIC to write data to such articles or control them remotely, if they are configured for such control.

The OIC 104 can apply and enforce a sophisticated security scheme for all inbound and outbound communication, for example, one based on digital certificates. The OIC 104 can be built with any software development environment that fulfills the above-mentioned requirements.

Communication Middleware Component

The components communicate by sending and receiving standardized events, which the components can send and receive through a network. The CMC 106 validates and routes standardized events between the OIC 104 and the CAIC 108 (which will be described below) and, in general, between or among any of the system components. The CMC 106 can also validate and route standardized events between or among any of the system components and other applications, devices, and components.

The CMC 106 performs functions such as data and authentication validation, storage and retrieving, archiving, data decryption/encryption, and multicasting of events. The CMC 106 can apply and enforce a sophisticated security scheme for all inbound and outbound communication, e.g., one based on digital certificates. The CMC 106 can be built with any software development environment that fulfills the above-mentioned requirements.

Context-Aware Intelligence Component

The CAIC 108 includes logic that provides the intelligence for the system to receive, process, and respond to queries concerning what, where, and how tagged articles represented by introduced objects are, were, or will be at a specific time in relation to each other or in relation to features of the real world. The CAIC 108 offers open internal and external interfaces to plug-in additional features such as applications and rules, extending its generic set of services.

As mentioned earlier, the system can include context objects that represent events that potentially can affect articles. Examples of such events include hurricanes, points or areas of high temperatures, and slow traffic. Context objects can also describe a specific relationship between or among articles. Context objects can also describe attributes of articles. Examples of attributes include a geospatial route, a velocity, and a destination. Telemetry readings of sensors can also be introduced as context objects.

The CAIC 108 includes a database that allows the system to store and retrieve the current state of introduced objects as well as the history of state changes of these objects. This database can process geospatial data and can be distributed over multiple computers and multiple sites.

The CAIC 108 can apply and enforce a sophisticated security scheme, such as one based on digital certificates, for all inbound and outbound communications. The CAIC 108 can be built with any software development environment that fulfills the above-mentioned requirements.

Human Interface Component

The HIC 110 generically integrates a multitude of technologies suited to allow human beings easy access to and control of the system. These technologies include, e.g., HTML or XML-based, voice controlled, stylus controlled and multi-modal human interfaces including all kinds of data visualization technologies and the like. The HIC 110 separates the application and infrastructure layer from the representation and human interaction layer.

The HIC 110 can apply and enforce a sophisticated security scheme, such as one based on digital certificates, for all inbound and outbound communication. The HIC 110 can be built with any software development environment that fulfills the above-mentioned requirements.

Operation

Introducing Objects to the System

In operation, physical and context objects can be introduced to the system using standardized parameterized events that include at least a system UID. Additionally, specific attributes, methods, and rules can be attached to the introduced object (e.g., current temperature, current owner, manufacturer, temperature exceptions, alerts, rules, data access, and authority specifications).

Unique Identifier

The system maps all introduced objects to a system UID. For the system to be able to scale from a local to a global level and also integrate satisfactorily with other systems, this identifier should be globally unique. If the referent of the object has a tag with an identifier that is globally unique, that identifier can be—but need not be—used as the UID. One such unique identifier is the Electronic Product Code (ePC) of the MIT (Massachusetts Institute of Technology) AutoID Center. FIG. 2 illustrates the format of the ePC.

The system can partition the UID to enhance search performance.

One way of uniquely tagging articles is to attach RFID chips to them. These electronic chips hold at least a relatively unique identifier that can be read by specific reader devices. More sophisticated chips feature dynamic data storage with external read/write abilities and smart chips include built-in processing power. One advantage of RFID technology is the ability to automatically identify a multitude of articles over a distance without the need to disassemble or unpack them. Alternatively, the system can use other technologies, such as item-level bar codes, magnetic tags, and polymer tags, to tag physical objects with identifiers that can be mapped to a system UID.

Events

The system communicates internally and externally by using events. Table 1 provides an example an XML document representing such an event. Any convenient form of representing events can be used.

TABLE 1

```
<event>
    <type>SEEN_OBJECT</type>
    <parameters>
        <sender>
            <UID>xx.xxxxxxx.xxxxxx.xxxxxxxxx</UID>
            <type>RFID_READER</type>
        </sender>
        <telemetry>
            <UID>xx.xxxxxxx.xxxxxx.xxxxxxxxy</UID>
            <temperature>
                <unit>C</unit>
                <value>45.43</value>
            </temperature>
        </telemetry>
    </parameters>
</event>
```

Time, Space, Unique Identity, Context, Hierarchy

The system maps every introduced object to system-wide standardized dimensions of time, space (3-D), unique identity (UID), and context. The system saves input data with system-wide synchronized time stamps. Space refers to everything from a point (pure location) to a complex three-dimensional polyhedron in a three-dimensional space (representing, e.g., location, size, and shape of an article). Context can be n-dimensional (representing, e.g., attributes such as temperature, velocity, and weight).

Each dimension is measured in system-wide standard units, e.g., units based on international standards like Coordinated Universal Time ("UTC"), and the International System of Units ("SI").

Because time and space are universal dimensions, the system's core space is compatible with all other systems, such as GIS, that also work in these dimensions or subsets of them. Introduced objects can be part of dynamic hierarchies. Hierarchies can be described by context objects.

Based on internal or external event data, the system tracks and logs the state of articles represented by introduced objects within the above-described space. It is then able to answer questions or provide alerts about the state of, and relationships between, introduced objects in that space, such as:

Where was article (UID) on Dec. 12, 2001?

Where are all articles (UID) of type x within a radius of y of address z?

Which of my supplies are affected by tropical storm x?

Where are the nearest spare parts for asset x and how fast could they be delivered to plant y?

Where are all delivered products with lot number x right now?

Where is the nearest demand for my products x with an expiration date before y?

Alert! Chemical assets x and y are stored too close to each other.

Alert! Employee x is not allowed to carry laptop y out of building z.

Based on historical data, statistical or other methods, the system can also derive the future state or behavior of introduced objects or groups of them.

Direct or Derived Location Data

The location of articles can be described to the system in a variety of ways. An example for a direct description is a latitude, longitude, and altitude data set configured in a standard way.

An example for a derived location description is the street address of a facility where a tag reader is located. The system maps the street address of the tag reader to the system's standard coordinate system, assumes that the article (as represented by its UID) encountered by the tag reader is near the tag reader, and associates the reader's location with the article's location.

Object-Level Data Access Authorization Model

The object model may include a UID, attributes, and a definition of which system users have read/write/change authorities of which attributes, methods, and rules. The system assigns to each of its users a globally unique identifier, which may be based on the Electronic Product Code (ePC), the EPC Manager part of the ePC, or the like.

Depending on the assigned authorization and using standardized parameterized events, system users write, read, and change data of introduced objects. Object data access is dependent on defined authorization settings. Table 2 provides an example an XML document representing a physical object implementing the described authorization model. This is just an example, however, and any convenient representation can be used.

TABLE 2

```
<physical_object>
<UID>xx.xxxxxxxx.xxxxxx.xxxxxxxxx</UID>
<current_owner>
    <OUID>xxxxxxx</OUID>
    <change_authorization>
        <OUID>xxxxxxx</OUID>
    </change_authorization>
</current_owner>
<price>
    <unit>USD</unit>
    <value>230000</value>
    <read_authorization>
        <OUID>xxxxxxx</OUID>
        <OUID>yyyyyyy</OUID>
        <OUID>zzzzzzz</OUID>
    </read_authorization>
    <write_authorization>
        <OUID>xxxxxxx</OUID>
    </write_authorization>
    <change_authorization>
        <OUID>xxxxxxx</OUID>
    </change_authorization>
</price>
</physical_object>
```

Communication Security Scheme

The system includes a generic authentication and security scheme (such as one based on digital certificates and encryption) for communication with and between the components and for communication to other systems and external devices.

Applications of the System

One application of the system will now be described in which the system tracks and logs location and temperature of high quality fish products that a Shipper Y is transporting from a Manufacturer X to a Retailer Z.

The following generally describes how the system accomplishes the described functions. Manufacturer X boxes the products and attaches a RFID tag to each box. The RFID tag includes a UID and, in addition, can store an expiration date, a maximum temperature threshold, and a maximum encountered temperature reading ($T_{max}$). Manufacturer X loads the boxes on pallets and attaches an active, recyclable temperature-sensor device to each pallet. Alternatively, and at greater expense, such a sensor could be attached to each box. These devices have an RFID tag attached that includes a UID and, in addition, can store temperature readings and a maximum encountered temperature reading ($T_{max}$). The devices periodically measure the current temperature and store the readings on their attached RFID tag. Alerts are triggered when temperature exceeds a specific threshold. Upon arrival at the retailer, updated expiration dates and maximum encountered temperature data based on the temperature history logs of the sensor devices is written to the RFID tags of each box.

Manufacturer X wants to decrease the number of boxes rejected by Retailer Z ("rejects") for which Shipper Y is to be held responsible, for example, boxes exposed to high temperatures during shipping. Shipper Y wants to gain market share by providing better customer satisfaction by ensuring full visibility of the current location and temperature of shipments. In addition, Shipper Y wants to detect quality problems and theft caused by contractors. Retailer Z wants to be able to identify and reject spoiled products upon arrival and, thus, cut costs by decreasing returns while, at the same time, achieve higher customer satisfaction.

The following describes in detail how the system helps each party achieve its goals. FIG. 3 illustrates one implementation in which Manufacturer X, Shipper Y, and Retailer Z procure and implement a local installation of the Object Interface Component (OIC) 34x, 34y, 34z of the system behind their respective firewalls 33x, 33y, 33z. In addition, they jointly use the Tagging Component (TC) 32, Communication Middleware Component (CMC) 36, Context-Aware Intelligence Component (CAIC) 37 and Human Interface Component (HIC) 38 of an external application service provider, who provides these services through a network such as the Internet. Alternatively, each party can subscribe to an implementation of the system which is provided by a service provider. In this latter case, each party need not procure and install an OIC. In yet an another alternative, one or more of the parties can install all five component of the system for use by all of them. In this case, the parties need not subscribe to a service provider; their CMCs can communicate by sending events over a network such as the Internet.

Based on the specifications, standards, best industry practices, and other information obtained from the TC, Manufacturer X procures read-write RFID tags and interrogators compliant with the above-described product and scenario requirements (e.g., active or passive RFID tag, frequency, reader range, temperature sensor built-in, memory size, price point, case material, and bonding requirements). Based on the specifications, standards, best industry practices, and other information obtained from the TC, Shipper Y and Retailer Z each procure a number of RFID interrogators (which can be read-only) that are compliant with the RFID tags of Manufacturer X and the system.

Figure 4:
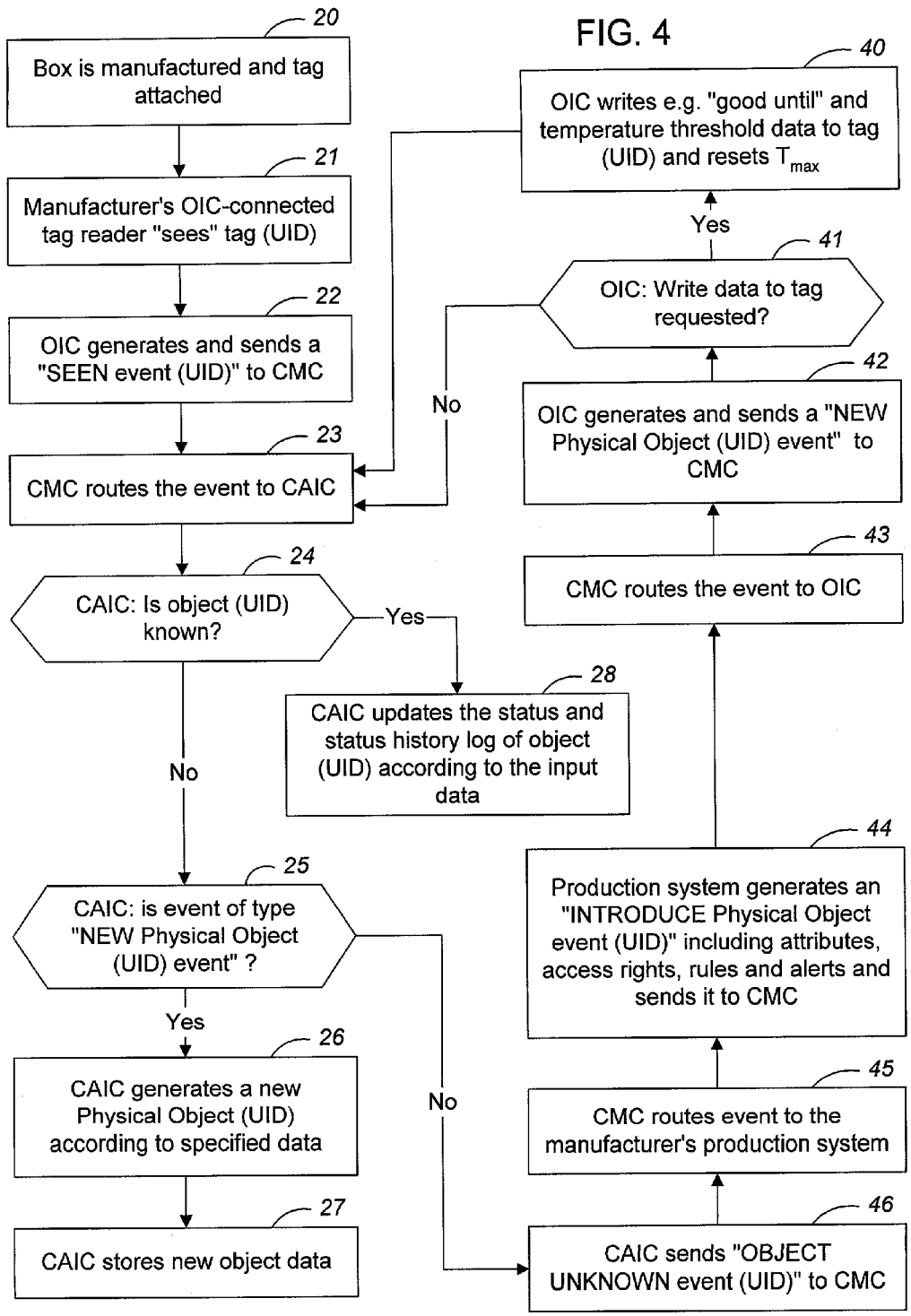
FIG. 4 illustrates an article object introduction process in accordance with the invention.

When Manufacturer X produces a box of products, Manufacturer X attaches one RFID tag and introduces to the system its unique identifier, allowed temperature ranges, and initial expiration date to the system. FIG. 4 illustrates this introduction operation. A box is manufactured and a tag is attached (step 20). The manufacturer's OIC-connected tag reader senses the tag and reads its UID (step 21). The OIC generates and sends a SEEN event including the UID to the CMC (step 22), which routes it to the CAIC (step 23). If an object for the UID is known, the CAIC updates the status and status history log of the object according to the input data ("yes" branch of step 24; step 28); otherwise, the CAIC determines whether the event is a NEW physical object event (decision step 25). If the event is a NEW object event, the CAIC generates a new physical object for the UID according to the specified data (step 26) and stores the new object data (step 27). Otherwise, the following actions occur. The CAIC sends an OBJECT UNKNOWN event for the UID to the CMC (step 46). The CMC routes this event to the manufacturer's production system (step 45), which generates an INTRODUCE physical object event for the UID with attributes, access rights, rules, and alerts and sends this event to the CMC (step 44). The CMC routes this event to the OIC (step 43), which generates and sends a NEW physical object event for the UID to the CMC (step 42). The OIC also determines whether there is a request to write data to the tag (step 41). If there is, the OIC writes the data to the tag (step 40). In this illustration, the data is a "good until" date, a temperature threshold, and a maximum encountered temperature reading (step 40). In any case, the NEW physical object event is routed by the CMC to the CAIC (step 23) for handling as has been described.

Figures 5, 6:
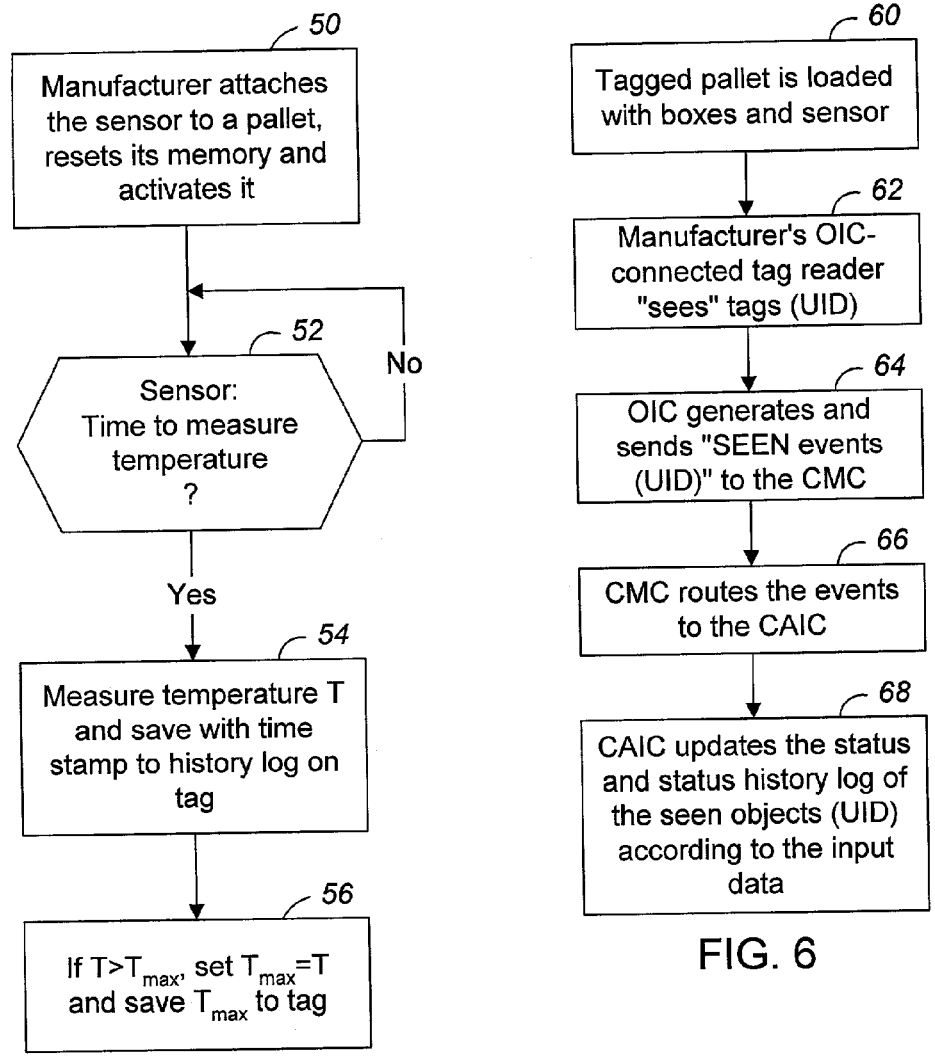
FIG. 5 illustrates the operation of a temperature sensor device and an RFID tag in accordance with the invention.
FIG. 6 provides an example of the system's response to an event such as the loading of boxes onto a pallet.

As shown in FIG. 5, when Manufacturer X loads a pallet for delivery, Manufacturer X attaches an active temperature sensor to the pallet, resets the memory of the sensor and activates it (step 50). The sensor measures temperature on a time schedule (step 52), saving the measured temperatures with time stamps to a history log on the tag (step 54). If the temperature exceeds the maximum encountered, this new maximum is also stored on the tag (step 56).

FIG. 6 illustrates the system's response to the loading of boxes onto the pallet with a sensor (step 60). The manufacturer's OIC-connected tag reader senses the tags and their UIDs (step 62) and generates SEEN events for the UIDs that it sends to the CMC (step 64). The CMC routes these events to the CAIC (step 66). The CAIC updates the status and status history log of the objects identified by the sensed UIDs according to the input data from the events (step 68).

Figure 7:
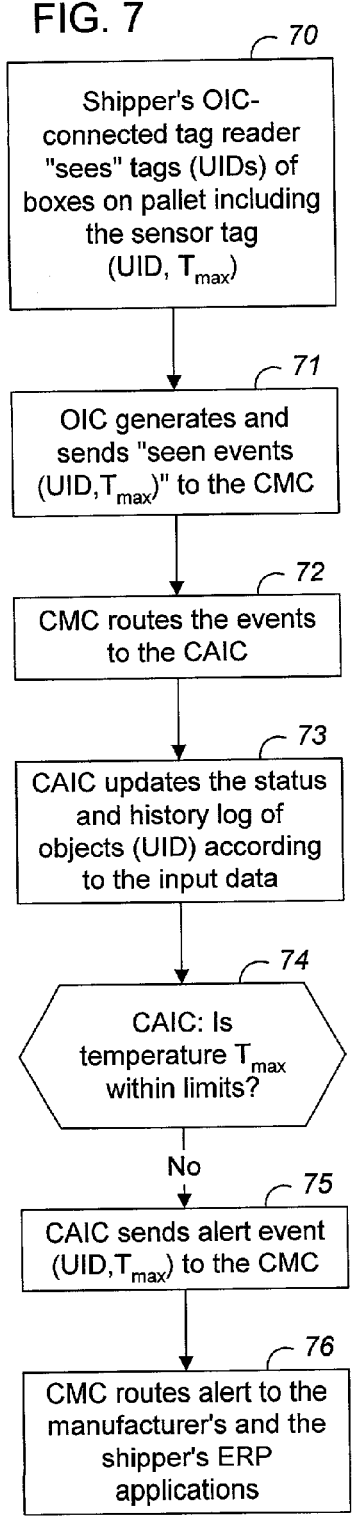
FIG. 7 illustrates an update operation in accordance with the invention.

When Shipper Y's OIC-connected readers sense a tag, the CAIC updates the system. FIG. 7 illustrates this update operation. The shipper's OIC-connected tag reader senses the tags of the boxes on the pallet including the sensor tag, reading their UIDs and $T_{max}$ data (step 70). The OIC generates and sends SEEN events to the CMC with the data (step 71). The CMC routes the events to the CAIC (step 72). The CAIC updates the status and history log of the corresponding objects according to the received input data (step 73). The CAIC determines whether the $T_{max}$ is within limits (step 74). If not, the CAIC sends an alert event to the CMC ("no" branch from step 74; step 75), and the CMC routes the alert to the manufacturer's and the shipper's ERP applications (step 76).

Figure 8:
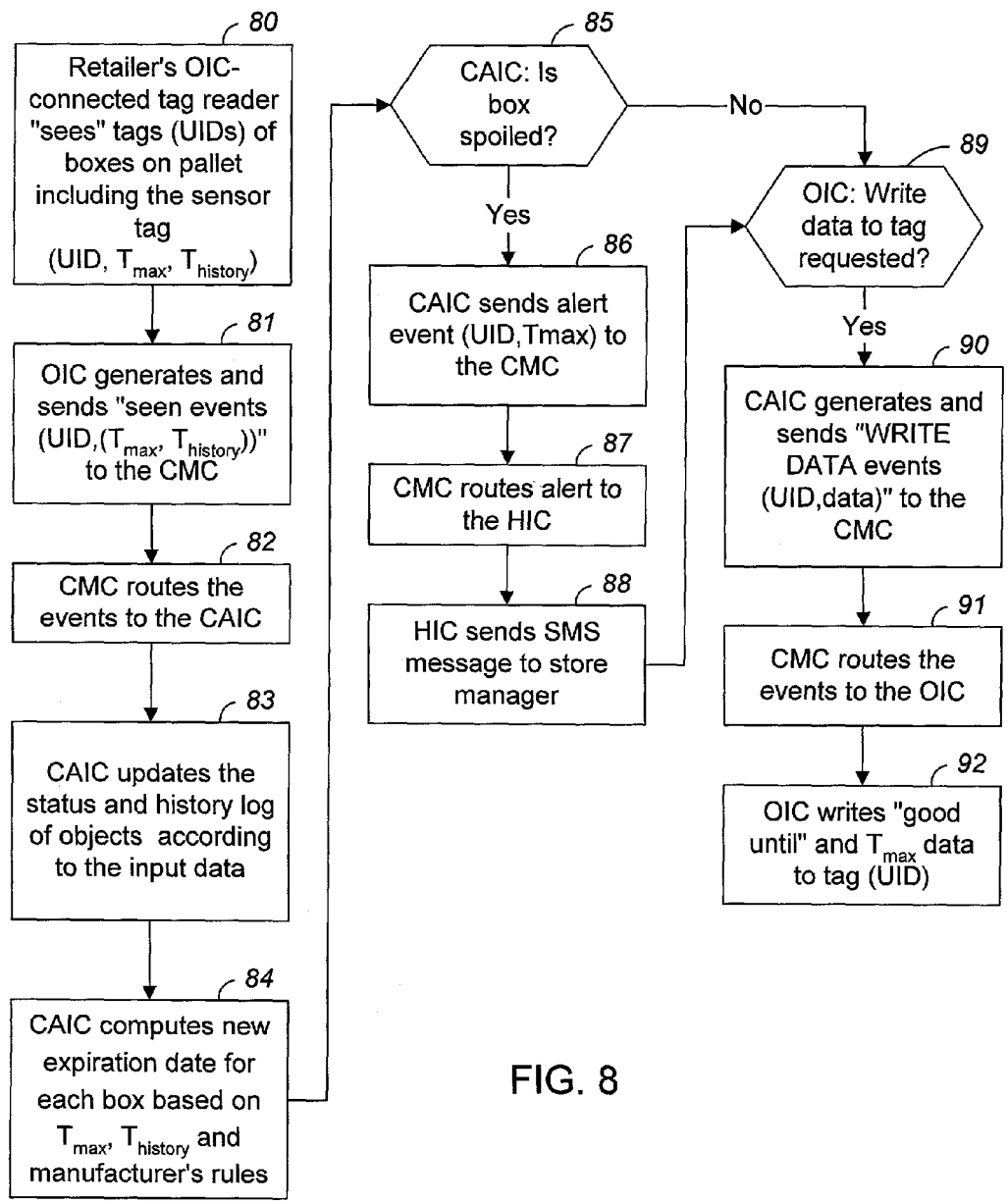
FIG. 8 illustrates update, reading, and alert operations in accordance with the invention.

On receipt of the shipment, Retailer Z reads and validates the products' actual maximum temperature data from the attached RFID tags and expiration date. FIG. 8 also illustrates this reading operation.

When spoiled boxes are detected, they are identified and the CAIC alerts the store manager using the HIC component. SMS (Short Message Service) messages, pager messages, or any other convenient form of message transmission, can be used for this purpose. FIG. 8 also illustrates this alert operation where a retailer's OIC-connected tag reader senses and reads the UIDs of tags of boxes on a pallet include a sensor tag carrying a UID, a maximum temperature $T_{max}$ and a temperature history $T_{history}$ (step 80). The OIC generates and sends to the CMC SEEN events with the UID, $T_{max}$ and $T_{history}$ information (step 81). The CMC routes the events to the CAIC (step 82). The CAIC updates the status and history log of objects according to the input data (step 83). The CAIC also computes a new expiration date for each box based on the $T_{max}$ and $T_{history}$ information and the manufacturer's rules (step 84). If the CAIC determines that the box is spoiled ("yes" branch from decision step 85), the CAIC sends an alert event with UID and $T_{max}$ to the CMC (step 86), which routes the alert to the HIC (step 87). The HIC then sends an SMS message alerting the retail store manager (step 88). Whether or not the box is spoiled, the OIC determines whether there is a request that data be written to the tag (step 89), and if it there is, the CAIC generates and sends WRITE DATA events with the UID and data for the tags to the CMC (step 90). The CMC routes these events to the OIC (step 91), which writes "good until" and $T_{max}$ data to the tags (step 92).

Figure 9:
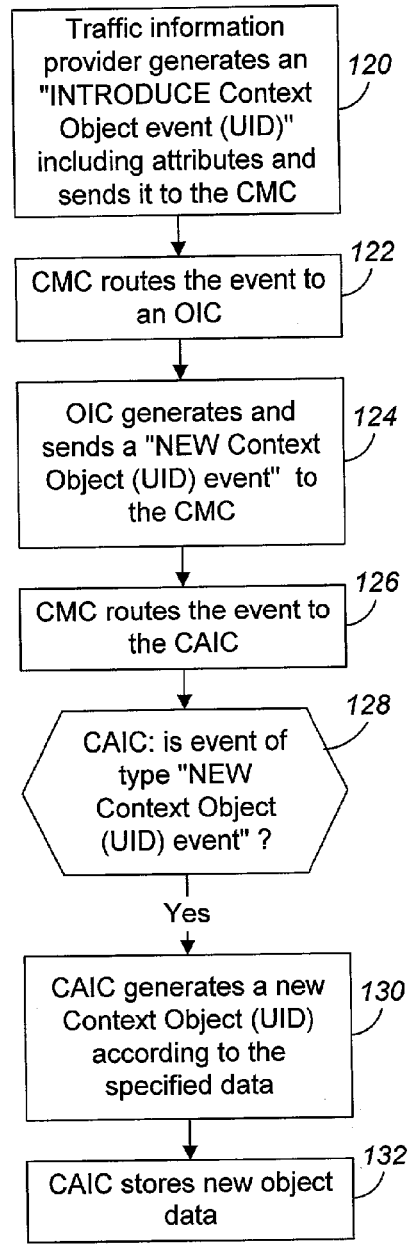
FIG. 9 illustrates a feed operation in accordance with the invention.

The system can receive context information from third party providers, for example, traffic or weather information. In general, information can be brought into the system either by having the providers push the information, or having the system pull the information. Having such information enables the system to report or forecast shipping delays or other situations that can affect the movement or condition of introduced articles. FIG. 9 illustrates this implemented with the providers feeding information into the system. In this illustration, a traffic information provider generates an INTRODUCE context object event with a UID and attributes and sends the event to the CMC (step 120), which routes the event to an OIC (step 122). The receiving OIC generates a NEW context object event with UID to the CMC (step 124), which routes the event to the CAIC (step 126). The CAIC determines that the event is of the type NEW context object event ("yes" branch of decision step 128), generates a new context object for the UID according to the specified data (step 130), and stores the new object data (step 132).

Figure 10:
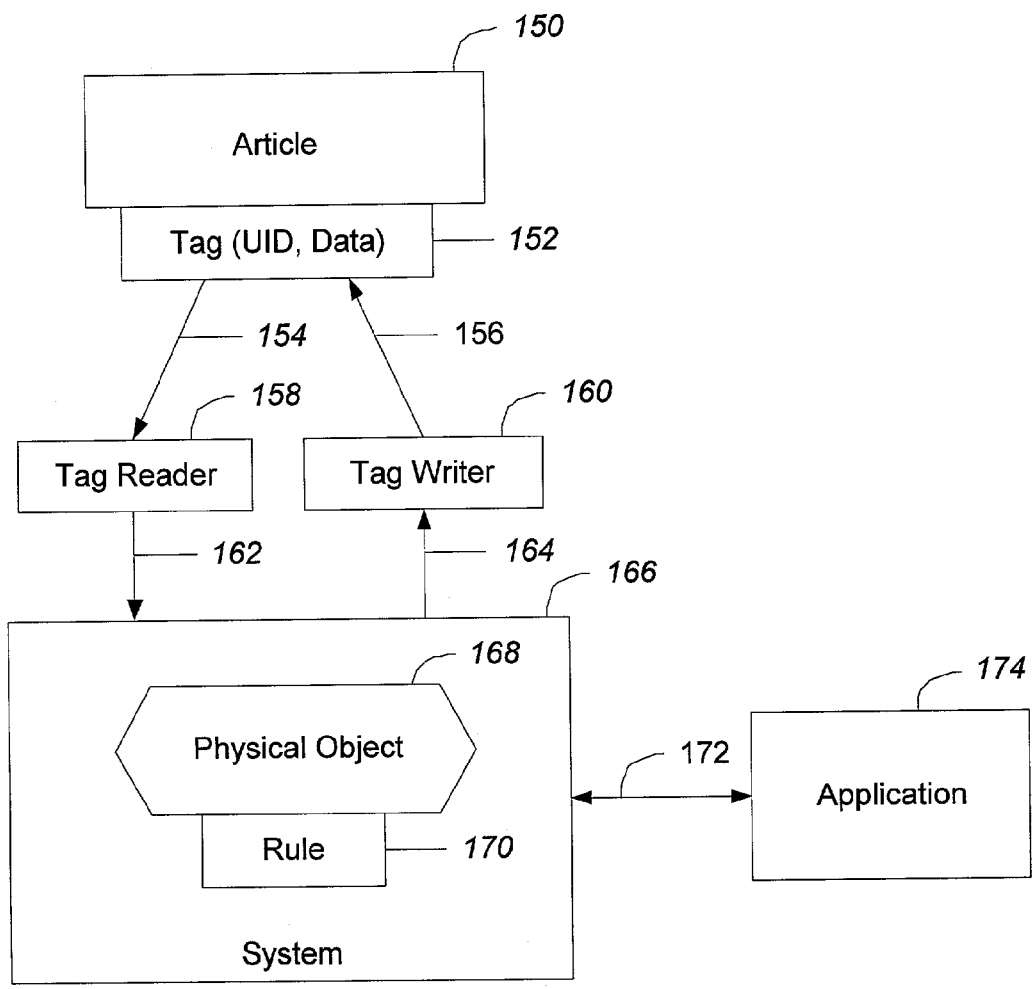
FIG. 10 is a block diagram illustrating one scenario of alert recognition and data flow to and from a tag.

The system can provided data flow and bi-directional data flow on tags. FIG. 10 illustrates one scenario. A tag 152 is attached to a box 150. The tag contains a UID, and, in addition, can store an expiration date, a maximum temperature threshold, a maximum encountered temperature reading, and a price. The temperature data on tag 152 can be updated as often as the temperature of box 150 is measured, e.g., at a temperature measuring station that can write its readings to tag 152 or, by a temperature sensor operably coupled to tag 152.

The data on tag 152 can be automatically read by tag reader 158, e.g., using RFID technology. In one embodiment, tag reader 158 periodically "scans" its environment within a specific range. In another embodiment, tag reader 158 is triggered to scan its environment, e.g., by a proximity sensor. If a scan returns valid read data (through communication 154), e.g., because tag 152 has been moved into the scanned range, tag reader 158 will send the received data to system 166 (through communication 162). For this example, it is assumed that the system 166 maintains a physical object 168 previously introduced by an external application 174 (through communication 172) and that the external application 174 also defined and attached a rule 170 to physical object 168. Rule 170 is defined as "if the maximum encountered temperature of the box as stored on its tag is higher than 45 degrees Fahrenheit, then write the current date as new expiration date to its tag." Rule 170 can be defined in any format, syntax or computer code that is compatible with system 166. Whenever system 166 receives new data read from tag 152, it will execute rule 170. If rule 170 returns a positive result, system 166 will compute a new expiration date, such as the current date, send the new expiration date and the UID of tag 152 to tag writer 160 (by communication 164), and cause tag writer 160 to write the new expiration data to the expiration data field on the tag 152 (through communication 156).

Figure 11:
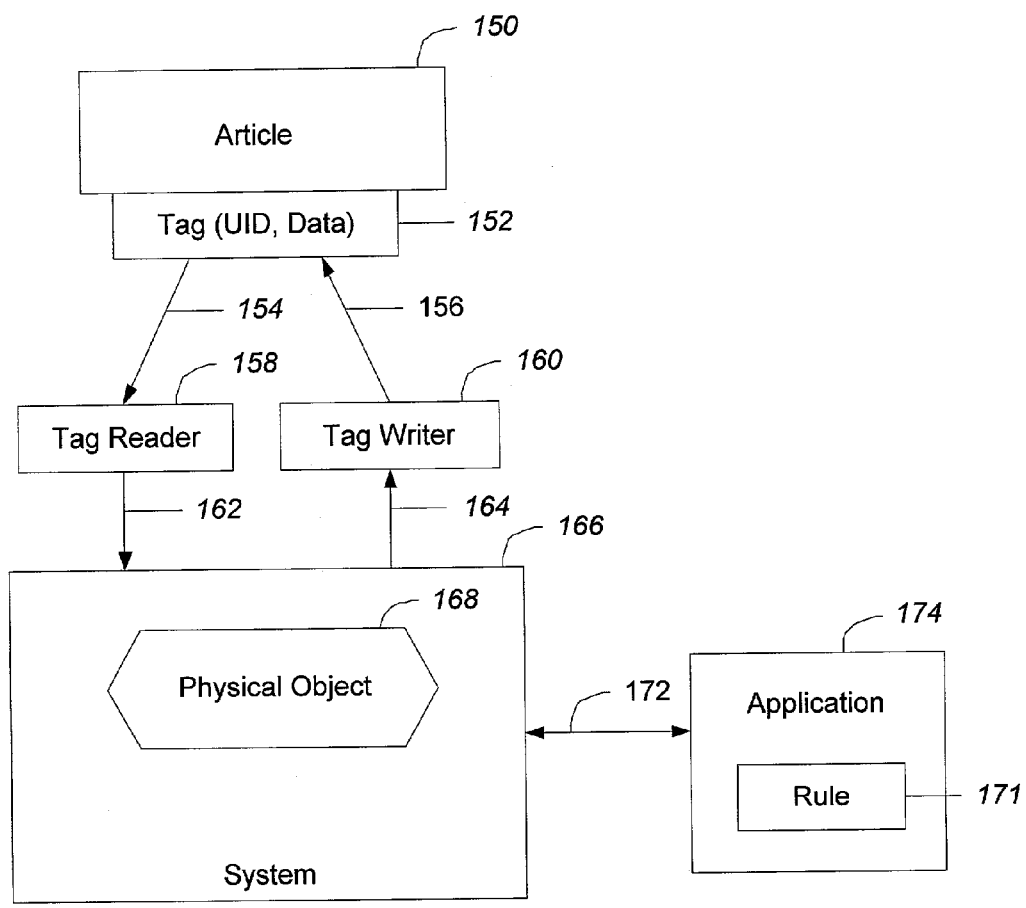
FIG. 11 is a block diagram illustrating another scenario of alert recognition and data flow to and from a tag.

FIG. 11 illustrates another scenario, in which external application 174 periodically queries system 166 for the latest status of the maximum encountered temperature of the box 150 as stored on its tag 152. In this scenario, the logic, which may again be identified as a rule 171, is part of the external application 174. The external application 174 transmits an event to system 166 that contains the UID of tag 152, a new expiration date, an updated price, and updated regulatory information. This event triggers system 166 to send the received expiration date, price, and UID to a tag writer 160 (through communication 164). The system 166 then causes the tag writer 160 to write the received data to the corresponding data fields on the tag 152. The communications that have been mentioned can take place through any communication medium, including over a network, for example, the Internet.

In these scenarios, with a tag reader that is able to read the data stored on the tag 152, a receiver of the box 150 will be able to identify an expiration date and price that is based on the temperature that the box 150 has been exposed to during tracking.

Figures 12, 13:
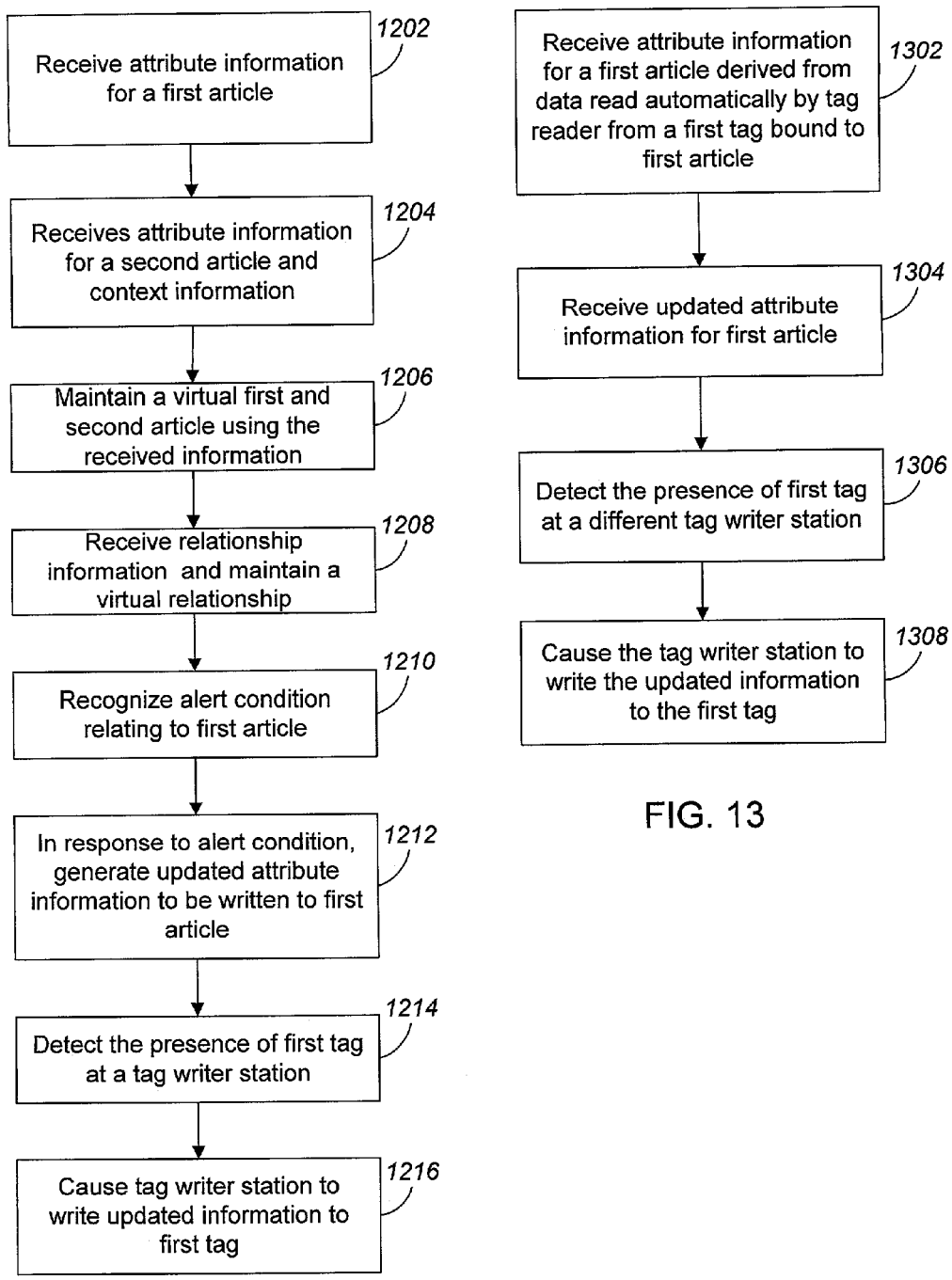
FIG. 12 is a flow chart showing one aspect of a process of data flow.
FIG. 13 is a flow chart of showing another aspect of a process of data flow.

FIG. 12 illustrates one aspect of the process of data flow. In an illustrative example, the system receives attribute information for a first article including its UID by reading a first tag bound to the first article (step 1202). The system similarly receives attribute information for a second article and context information derived from data read automatically from a sensor coupled to the second article (step 1204). The system maintains a virtual first and second article using this information (step 1206). The system also receives relationship information specifying a relationship between the articles and maintains a virtual relationship (step 1208). Having this information, the system can recognize an alert condition relating to the first article based at least in part on one of the virtual articles (step 1210). In response to the alert condition, the system generates updated attribute information to be written to the first article (step 1212). The system then detects the presence of the first tag at a tag writer station (step 1214) and causes the tag writer station to write the updated information to the first tag (step 1216).

In these scenarios, the alert condition can be recognized, and the rules for responding to the alert and computing updated information, in the system itself, or this can be done in an application external to the system. In the latter case, the application receives from the system information from objects maintained by the system and generates the updated attribute information and provides it to the system with a request that it be written to the first tag.

FIG. 13 illustrates another aspect of the process of data flow. In an illustrative example, the system receives attribute information for a first article derived from tag data read automatically by a first tag reader from a first tag bound to the first article (step 1302). The system also receives updated attribute information for the first article (step 1304). The system later detects the presence of the first tag at a different tag writer station (step 1306) and causes the tag writer station to write the updated information to the first tag (step 1308). In this scenario, the updated information can be computed in the system itself, or this can be done in an application external to the system. In the latter case, the application receives from the system information from objects maintained by the system and generates the updated attribute information and provides it to the system with a request that it be written to the tag.

The system can be applied to other scenarios. The system supports the development of a range of new and enhanced applications across industries on a local to global scale. Other applications of the system includes supply chain management, asset tracking management, security and access control, transportation, toll collection, point of sales applications, and baggage handling. These examples are further described below.

Supply Chain Management

RFID systems are ideally suited for the identification of high-unit high-value products moving through an assembly process (such as automobile or agricultural equipment production). RFID systems also offer the durability essential for permanent identification of product carriers such as boxes, crates, and pallets. Other applications within supply chain management include work-in-progress tracking and parcel delivery.

Asset Tracking and Management

Asset tracking and management applications include those for monitoring the flow of equipment, people, and documents within a space such as a building, yard, or terminal, for example, to tighten control over assets and keep good track of articles, including individuals. Specific applications within asset management include: Records/document tracking, people tracking, yard management, and equipment tracking.

Security and Access Control

The movement and use of valuable equipment and personnel resources can be monitored through transponders attached to equipment or carried by the equipment or personnel. Transponders can also be embedded in credit card size security badges. Home security call systems and building access are two examples of security and access control applications.

Transportation

Transponders can be attached to vehicles (e.g., aircraft, rail cars, trucks) and can contain important information about the vehicle and its contents. Transportation applications include aircraft identification, rail car and shipping container tracking, public transportation ticketing, and weigh station applications.

Toll Collection

Toll collection applications involve attaching a transponder to a vehicle. The transponder transmits a code, which identifies a prepaid account, to a reader which automatically deducts the toll from the prepaid account.

Point of Sale

These applications include electronic surveillance of retail items, forgery prevention, and sales transactions and usually involve tagging individual retail items with low cost transponders, which are essentially active tags.

Baggage Handling

In a baggage handling application, airline luggage is tagged with RFID transponders such as smart labels to allow airline baggage handling operations to track baggage from the moment a traveler checks into an airport to the moment the traveler reaches his final destination.

CONCLUSION

The invention has been described in terms of particular embodiments. Other embodiments are within the scope of the claims. For example, the steps of the invention can be performed in a different order and still achieve desirable results. The system is flexible and offers many business methods for tracking articles. In one method, one or more customers subscribe to the system, which is provided by a service provider who distributes the services over a network such as the Internet. In this case, the customers need not procure components or the entire system, thereby saving capital costs. Alternatively, the customers procure components of or the entire system, thereby saving operational cost. Alternatively, the system can support any combination of the described business methods. For example, some customer can subscribe to the system and some customer can procure components or the entire system.

What is claimed is:

1. A method for updating information on a writable tag bound to an article, comprising:

receiving in a system first attribute information for a first article, where the first attribute information was derived from data read automatically from a first tag bound to the first article, the first attribute information including a first identifier identifying the first article;

receiving in the system second attribute information for a second article, where the second attribute information was derived from data read automatically from a second tag bound to the second article, the second attribute information including a second identifier identifying the second article;

receiving in the system sensor information derived from data sensed by a sensor coupled to the second article such that the sensor information represents at least one condition existing at the second article;

receiving in the system relationship information specifying a relationship of physical proximity between the first article and the second article;

maintaining in the system a first physical object representing the first article, the first physical object maintaining information representing the first attribute information;

maintaining in the system a second physical object representing the second article, the second physical object maintaining information representing the second attribute information;

maintaining in the system a context object representing the relationship of physical proximity between the first article and the second article;

associating the sensor information, derived from the data sensed by the sensor coupled to the second article, with the first physical object based on the relationship of physical proximity between the first article and the second article represented in the context object such that the sensor information is determined to describe at least one condition existing at the first article;

comparing the sensor information with the first attribute information;

determining that an alert condition exists at the first article based on a result of comparing the sensor information and the first attribute information;

generating updated attribute information to be written to the first article in response to the determined alert condition;

detecting in the system the presence of the first tag at a tag writer station after the alert condition was determined to exist; and causing the tag writer station to write the updated information to the first tag at the tag writer station upon detecting the presence of the first tag at the tag writer station.

2. The method of claim 1, wherein:

the alert condition is determined to exist in an application external to the system, the application receiving from the system information from objects maintained by the system;

the updated attribute information is generated by the application and provided to the system by the application with a request that the updated attribute information be written to the first tag; and the system, in response to the request, causes the tag writer station to write the updated information to the first tag.

3. The method of claim 2, wherein:

the first and second physical objects represent their corresponding articles in a virtual world maintained by the system; and the application monitors the virtual world.

4. The method claim 1, wherein:

the alert condition is recognized by a component of the system operating in accordance with one or more alert rules provided to the system;

the updated information is generated by a component of the system operating in accordance with one or more update rules provided to the system;

the tag writer station is caused to write the updated information to the first tag in accordance with one or more write-data rules provided to the system.

5. The method of claim 1, wherein the sensor is bound to the second tag.

6. The method of claim 1, wherein the sensor is a temperature sensor.

7. The method of claim 6, wherein the alert condition is generated because a temperature measured by the sensor exceeded a threshold; and the updated information is a reduce product expiration date for the first article.

8. The method of claim 1, wherein the first tag is a radio frequency transponder.

9. The method of claim 1, wherein the first and second identifiers are globally unique identifiers.

10. The method of claim 1, wherein:

the updated attribute information is generated by an application external to the system and provided to the system by the application with a request that the updated attribute information be written to the first tag; and the system in response to the request causes the tag writer station to write the updated information to the first tag.

11. The method of claim 10, further comprising storing in the first physical object the updated attribute information.

12. The method of claim 11, wherein:

the first physical object represents its corresponding article in a virtual world maintained by the system; and the application monitors the virtual world.

13. The method of claim 1, wherein:

the updated attribute information is generated by a component of the system operating in accordance with one or more update rules provided to the system; and the tag writer station is caused to write the updated attribute information to the first tag in accordance with one or more write-data rules provided to the system.

14. The method of claim 1, wherein the updated attribute information is updated price information.

15. The method of claim 1, wherein the updated attribute information is updated expiration information.

16. The method of claim 1, wherein the updated attribute information is updated regulatory information.

17. The method of claim 1, wherein the first tag is a radio frequency transponder and the first identifier is a globally unique identifier.

18. The method of claim 1 wherein:

the first article is a box;

the second article is a pallet; and the alert condition indicates that a temperature threshold for the box has been exceeded.

19. The method of claim 1 further comprising:

receiving in the system additional attribute information for a plurality of additional articles, where the additional attribute information for each of the plurality of additional articles was derived from data read automatically from a plurality of additional tags, each of the plurality of additional tags bound to one of the plurality of additional articles, the additional attribute information for each of the plurality of additional articles including an identifier identifying each of the plurality of additional articles;

maintaining in the system a plurality of additional physical objects, each of the plurality of additional physical objects corresponding to one of the plurality of additional articles and maintaining information representing the additional attribute information for the corresponding physical object;

receiving in the system additional relationship information for each of the plurality of additional articles, the additional relationship information indicating physical proximity between each of the plurality of additional articles and the second article;

maintaining in the system a plurality of additional context objects each of the plurality of additional context objects representing the relationship of physical proximity between each of the plurality of additional articles and the second article;

associating the sensor information derived from the data sensed by the sensor coupled to the second article with each of the plurality of additional physical objects based on the relationship of physical proximity between each of the plurality of additional articles and the second article indicated by the plurality of additional context objects such that the sensor information is (i) determined to describe at least one condition existing at each of the plurality of additional articles, as well as (ii) treated as existing at the second article;

comparing the sensor information with the additional attribute information for each of the plurality of additional articles;

determining, based on a result of the comparing of the sensor information with the additional attribute information for each of the plurality of additional articles, that an alert condition of one or more of the plurality of additional articles has occurred; and updating the additional attribute information for each of the one or more additional articles for which an alert condition has occurred to reflect that the alert condition has occurred.

20. A computer program product, tangibly stored on a computer-readable medium, for updating information on a writable tag bound to an article, the product comprising instructions operable to cause a programmable processor to:

receive in a system first attribute information for a first article, where the first attribute information was derived from data read automatically from a first tag bound to the first article, the first attribute information including a first identifier identifying the first article;

receive in the system second attribute information for a second article, where the second attribute information was derived from data read automatically from a second tag bound to the second article, the second attribute information including a second identifier identifying the second article;

receive in the system sensor information derived from data sensed by a sensor coupled to the second article such that the sensor information represents at least one condition existing at the second article;

receive in the system relationship information specifying a relationship of physical proximity between the first article and the second article;

maintain in the system a first physical object representing the first article, the first physical object maintaining information representing the first attribute information;

maintain in the system a second physical object representing the second article, the second physical object maintaining information representing the second attribute information;

maintain in the system a context object representing the relationship between the first article and the second article;

associate the sensor information, derived from the data sensed by the sensor coupled to the second article, with the first physical object based on the relationship of physical proximity between the first article and the second article represented in the context object such that the sensor information is determined to describe at least one condition existing at the first article;

compare the sensor information with the first attribute information;

determine that an alert condition exists at the first article based on a result of comparing the sensor information and the first attribute information;

generate updated attribute information to be written to the first article in response to the determined alert condition;

detect in the system the presence of the first tag at a tag writer station after the alert condition was determined to exist; and cause the tag writer station to write the updated information to the first tag at the tag writer station upon a detection of the presence of the first tag at the tag writer station.

21. The product of claim 20, further comprising instructions to:

provide from the system to an application external to the system information from objects maintained by the system;

receive from the external application updated attribute information generated by the application in response to an alert condition recognized by the application, and receive from the application a request that the updated information be written to the first tag; and cause the tag writer station to write the updated information to the first tag in response to the request.

22. The product of claim 21, wherein the first and second physical objects represent their corresponding articles in a virtual world maintained by the system, the product further comprising instructions to permit the application to monitor the virtual world.

23. The product claim 20, further comprising instructions to:

recognize the alert condition in accordance with one or more alert rules provided to the system;

generate the updated information in accordance with one or more update rules provided to the system; and cause the tag writer station to write the updated information to the first tag in accordance with one or more write-data rules provided to the system.

24. The product of claim 20, wherein the sensor is bound to the second tag.

25. The product of claim 20, wherein the sensor is a temperature sensor.

26. The product of claim 25, wherein the alert condition is generated because a temperature measured by the sensor exceeded a threshold; and the updated information is a reduce product expiration date for the first article.

27. The product of claim 20, wherein the first tag is a radio frequency transponder.

28. The product of claim 20, wherein the first and second identifiers are globally unique identifiers.

29. The product of claim 20, further comprising instructions to:

receive from an application external to the system updated attribute information and a request that the updated attribute information be written to the first tag; and cause the tag writer station to write the updated attribute information to the first tag in response to the request.

30. The product of claim 29 further comprising instructions to
store in the first physical object the updated attribute information.

31. The product of claim 30, wherein:
the first physical object represents its corresponding article in a virtual world maintained by the system; and
the application monitors the virtual world.

32. The product of claim 20, wherein:
the updated attribute information is generated by a component of the system operating in accordance with one or more update rules provided to the system; and
the tag writer station is caused to write the updated attribute information to the first tag in accordance with one or more write-data rules provided to the system.

33. The product of claim 20, wherein the updated attribute information is updated price information.

34. The product of claim 20, wherein the updated attribute information is updated expiration information.

35. The product of claim 20, wherein the updated attribute information is updated regulatory information.

36. The product of claim 20, wherein the first tag is a radio frequency transponder and the first identifier is a globally unique identifier.

37. The computer program product of claim 20 wherein:
the first article is a box;
the second article is a pallet; and
the alert condition indicates that a temperature threshold for the box has been exceeded; the product further comprising instructions operable to cause a programmable processor to:
receive in the system additional attribute information for a plurality of additional articles, where the additional attribute information for each of the plurality of additional articles was derived from data read automatically from a plurality of additional tags, each of the plurality of additional tags bound to one of the plurality of additional articles, the additional attribute information for each of the plurality of additional articles including an identifier identifying each of the plurality of additional articles;
maintain in the system a plurality of additional physical objects, each of the plurality of additional physical objects corresponding to one of the plurality of additional articles and maintaining information representing the additional attribute information for the corresponding physical object;
receive in the system additional relationship information for each of the plurality of additional articles, the additional relationship information indicating physical proximity between each of the plurality of additional articles and the second article;
maintain in the system a plurality of additional context objects each of the plurality of additional context objects representing the relationship of physical proximity between each of the plurality of additional articles and the second article;
associate the sensor information derived from the data sensed by the sensor coupled to the second article with each of the plurality of additional physical objects based on the relationship of physical proximity between each of the plurality of additional articles and the second article indicated by the plurality of additional context objects such that the sensor information is (i) determined to describe at least one condition existing at each of the plurality of additional articles, as well as (ii) treated as existing at the second article;
compare the sensor information with the additional attribute information for each of the plurality of additional articles;
determine, based on a result of the comparing of the sensor information with the additional attribute information for each of the plurality of additional articles, that an alert condition of one or more of the plurality of additional articles has occurred; and
update the additional attribute information for each of the one or more additional articles for which an alert condition has occurred to reflect that the alert condition has occurred.

38. A system for updating information on a writable tag bound to an article, comprising:
means for receiving in a system first attribute information for a first article, where the first attribute information was derived from data read automatically from a first tag bound to the first article, the first attribute information including a first identifier identifying the first article;
means for receiving in the system second attribute information for a second article, where the second attribute information was derived from data read automatically from a second tag bound to the second article, the second attribute information including a second identifier identifying the second article;
means for receiving in the system sensor information derived from data sensed by a sensor coupled to the second article such that the sensor information represents at least one condition existing at the second article;
means for receiving in the system relationship information specifying a relationship of physical proximity between the first article and the second article;
means for maintaining in the system a first physical object representing the first article, the first physical object maintaining information representing the first attribute information;
means for maintaining in the system a second physical object representing the second article, the second physical object maintaining information representing the second attribute information;
means for maintaining in the system a context object representing the relationship between the first article and the second article;
means for associating the sensor information, derived from the data sensed by the sensor coupled to the second article, with the first physical object based on the relationship of physical proximity between the first article and the second article represented in the context object such that the sensor information is determined to describe at least one condition existing at the first article;
means for comparing the sensor information with the first attribute information;
means for determining that an alert condition exists at the first article based on a result of comparing the sensor information and the first attribute information;
means for generating updated attribute information to be written to the first article in response to the determined alert condition;
means for detecting in the system the presence of the first tag at a tag writer station after the alert condition was determined to exist; and means for causing the tag writer station to write the updated information to the first tag at the tag writer station upon detecting the presence of the first tag at the tag writer station.

39. The system of claim 38, wherein:
the alert condition is determined to exist in an application external to the system, the application receiving from the system information from objects maintained by the system;
the updated attribute information is generated by the application and provided to the system by the application with a request that the updated attribute information be written to the first tag; and
the system, in response to the request, causes the tag writer station to write the updated information to the first tag.

40. The system of claim 39, wherein:
the first and second physical objects represent their corresponding articles in a virtual world maintained by the system; and
the application monitors the virtual world.

41. The system of claim 38, wherein:
the alert condition is recognized by a component of the system operating in accordance with one or more alert rules provided to the system;
the updated information is generated by a component of the system operating in accordance with one or more update rules provided to the system;
the tag writer station is caused to write the updated information to the first tag in accordance with one or more write-data rules provided to the system.

42. The system of claim 38, wherein the sensor is bound to the second tag.

43. The system of claim 38, wherein the sensor is a temperature sensor.

44. The system of claim 43, wherein
the alert condition is generated because a temperature measured by the sensor exceeded a threshold; and
the updated information is a reduce product expiration date for the first article.

45. The system of claim 38, wherein the first tag is a radio frequency transponder.

46. The system of claim 38, wherein the first and second identifiers are globally unique identifiers.

47. The system of claim 38, wherein:
the updated attribute information is generated by an application external to the system and provided to the system by the application with a request that the updated attribute information be written to the first tag; and
the system in response to the request causes the tag writer station to write the updated attribute information to the first tag.

48. The system of claim 47 further comprising
means for storing in the first physical object the updated attribute information.

49. The system of claim 48, wherein:
the first physical object represents its corresponding article in a virtual world maintained by the system; and
the application monitors the virtual world.

50. The system of claim 38, wherein:
the updated attribute information is generated by a component of the system operating in accordance with one or more update rules provided to the system; and
the tag writer station is caused to write the updated attribute information to the first tag in accordance with one or more write-data rules provided to the system.

51. The system of claim 38, wherein the updated attribute information is updated price information.

52. The system of claim 38, wherein the updated attribute information is updated expiration information.

53. The system of claim 38, wherein the updated attribute information is updated regulatory information.

54. The system of claim 38, wherein the first tag is a radio frequency transponder and the first identifier is a globally unique identifier.

55. The system of claim 38 wherein:
the first article is a box;
the second article is a pallet; and
the alert condition indicates that a temperature threshold for the box has been exceeded; the system further comprising:
means for receiving in the system additional attribute information for a plurality of additional articles, where the additional attribute information for each of the plurality of additional articles was derived from data read automatically from a plurality of additional tags, each of the plurality of additional tags bound to one of the plurality of additional articles, the additional attribute information for each of the plurality of additional articles including an identifier identifying each of the plurality of additional articles;
means for maintaining in the system a plurality of additional physical objects, each of the plurality of additional physical objects corresponding to one of the plurality of additional articles and maintaining information representing the additional attribute information for the corresponding physical object;
means for receiving in the system additional relationship information for each of the plurality of additional articles, the additional relationship information indicating physical proximity between each of the plurality of additional articles and the second article;
means for maintaining in the system a plurality of additional context objects each of the plurality of additional context objects representing the relationship of physical proximity between each of the plurality of additional articles and the second article;
means for associating the sensor information derived from the data sensed by the sensor coupled to the second article with each of the plurality of additional physical objects based on the relationship of physical proximity between each of the plurality of additional articles and the second article indicated by the plurality of additional context objects such that the sensor information is (i) determined to describe at least one condition existing at each of the plurality of additional articles, as well as (ii) treated as existing at the second article;
means for comparing the sensor information with the additional attribute information for each of the plurality of additional articles;
means for determining, based on a result of the comparing of the sensor information with the additional attribute information for each of the plurality of additional articles, that an alert condition of one or more of the plurality of additional articles has occurred; and
means for updating the additional attribute information for each of the one or more additional articles for which an alert condition has occurred to reflect that the alert condition has occurred.

56. A method comprising:

maintaining in a system first attribute information for a first article;

maintaining in the system second attribute information for a second article;

receiving in the system relationship information indicating physical proximity between the first article and the second article;

receiving in the system sensor information describing a condition treated as existing at the second article;

associating the sensor information with the first article based on the physical proximity between the first article and the second article, indicated by the relationship information, such that the condition is (i) determined to exist at the first article, as well as (ii) treated as existing at the second article;

comparing the sensor information with the first attribute information;

determining, based on a result of the comparing of the sensor information with the first attribute information, that an alert condition of the first article has occurred; and updating the first attribute information to reflect that the alert condition has occurred.

57. The method of claim 56 wherein:

the first article is a box;

the second article is a pallet; and the alert condition indicates that a temperature threshold for the box has been exceeded.

58. The method of claim 56 further comprising:

maintaining in the system additional attribute information for a plurality of additional articles;

receiving in the system additional relationship information for each of the plurality of additional articles, the additional relationship information indicating physical proximity between each of the plurality of additional articles and the second article;

associating the sensor information with each of the plurality of additional articles based on the physical proximity between each of the plurality of additional articles and the second article indicated by the additional relationship information for each of the plurality of additional articles such that the condition is (i) determined to exist at each of the plurality of additional articles, as well as (ii) treated as existing at the second article;

comparing the sensor information with the additional attribute information for each of the plurality of additional articles;

determining, based on a result of the comparing of the sensor information with the additional attribute information for each of the plurality of additional articles, that an alert condition of one or more of the plurality of additional articles has occurred; and updating the additional attribute information for each of the one or more additional articles for which an alert condition has occurred to reflect that the alert condition has occurred.

* * * * *